United States Patent
Izadian

(10) Patent No.: US 10,120,063 B1
(45) Date of Patent: Nov. 6, 2018

(54) 2D COMPACT REACTIVE BEAM FORMING NETWORK FOR AUTOMOTIVE RADARS

(71) Applicant: Waymo LLC, Mountain View, CA (US)

(72) Inventor: Jamal Izadian, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 384 days.

(21) Appl. No.: 14/977,964

(22) Filed: Dec. 22, 2015

(51) Int. Cl.
  *G01S 7/32* (2006.01)
  *H01Q 21/00* (2006.01)

(52) U.S. Cl.
  CPC ........... *G01S 7/32* (2013.01); *H01Q 21/0037* (2013.01)

(58) Field of Classification Search
  CPC ............................. G01S 7/32; H01Q 21/0037
  USPC .......................................................... 342/70
  See application file for complete search history.

(56) References Cited

U.S. PATENT DOCUMENTS

| | | | | |
|---|---|---|---|---|
| 4,348,680 A | * | 9/1982 | Collier | H01Q 3/22 342/375 |
| 9,178,258 B1 | * | 11/2015 | Brown | H01P 3/12 |
| 2012/0062335 A1 | * | 3/2012 | Sherrer | H01P 5/12 333/127 |

* cited by examiner

*Primary Examiner* — Frank J McGue
(74) *Attorney, Agent, or Firm* — McDonnell Boehnen Hulbert and Berghoff LLP

(57) ABSTRACT

A radar system includes a plurality of radiating elements configured to radiate electromagnetic energy and a plurality of feed waveguides defining a common plane and configured to guide electromagnetic energy to the plurality of radiating elements. The radar system also includes a plurality of waveguides arranged as a dividing network. The dividing network is also configured to split the electromagnetic energy from the source among the plurality of feed waveguides, such that each feed waveguide receives a respective portion of the electromagnetic energy. Additionally, the dividing network is configured to adjust a phase of the electromagnetic energy received by each waveguide. The splitting and adjusting of the dividing network may be based on differences in width between the waveguides of the dividing network and the feed waveguides. The dividing network of waveguides is located in the common plane of the feed waveguides.

19 Claims, 12 Drawing Sheets

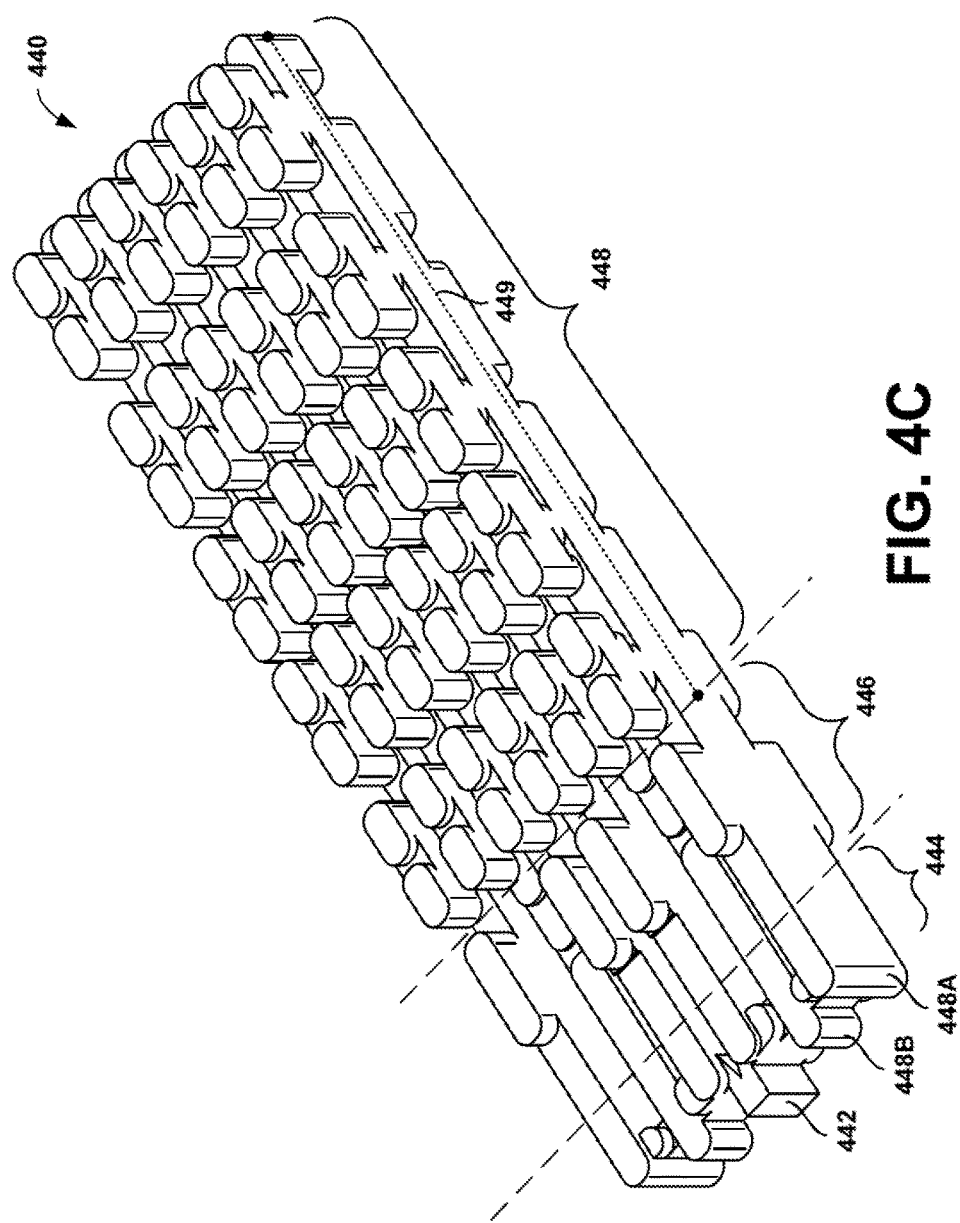

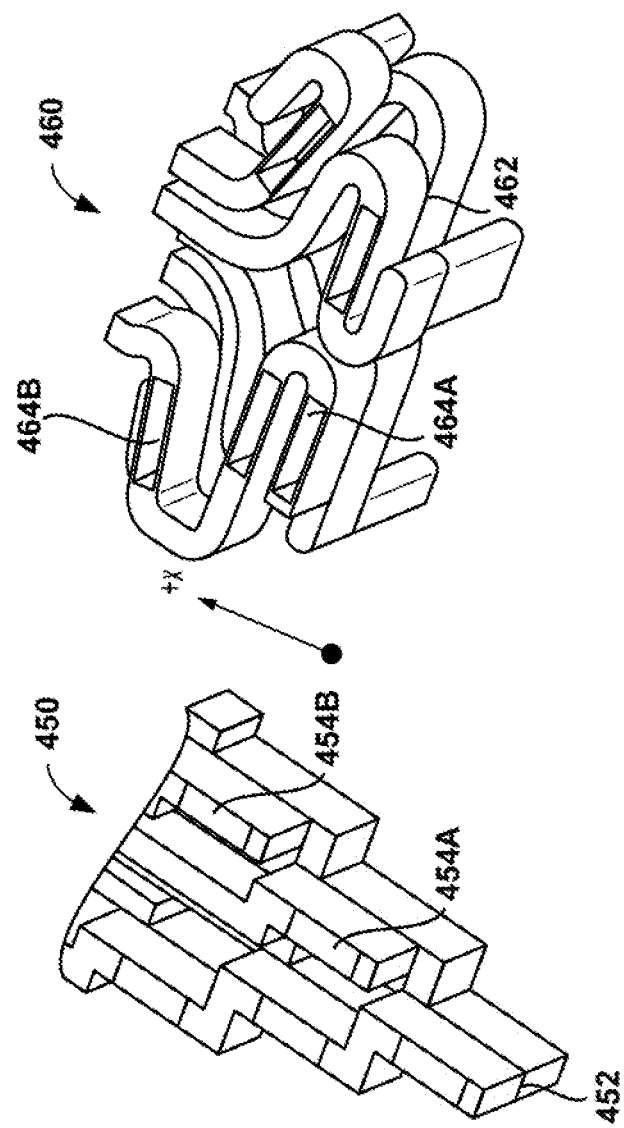

2D COMPACT REACTIVE BEAM FORMING NETWORK FOR AUTOMOTIVE RADARS

BACKGROUND

Unless otherwise indicated herein, the materials described in this section are not prior art to the claims in this application and are not admitted to be prior art by inclusion in this section.

Radio detection and ranging (RADAR) systems can be used to actively estimate distances to environmental features by emitting radio signals and detecting returning reflected signals. Distances to radio-reflective features can be determined according to the time delay between transmission and reception. The radar system can emit a signal that varies in frequency over time, such as a signal with a time-varying frequency ramp, and then relate the difference in frequency between the emitted signal and the reflected signal to a range estimate. Some systems may also estimate relative motion of reflective objects based on Doppler frequency shifts in the received reflected signals. Directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be mapped. The radar sensor can thus be used, for instance, by an autonomous vehicle control system to avoid obstacles indicated by the sensor information.

Some example automotive radar systems may be configured to operate at an electromagnetic wave frequency of 77 Giga-Hertz (GHz), which corresponds to millimeter (mm) electromagnetic wave length (e.g., 3.9 mm for 77 GHz). These radar systems may use antennas that can focus the radiated energy into tight beams in order to enable the radar system to measure an environment with high accuracy, such as an environment around an autonomous vehicle. Such antennas may be compact (typically with rectangular form factors; e.g., 1.3 inches high by 2.5 inches wide), efficient (i.e., there should be little 77 GHz energy lost to heat in the antenna, or reflected back into the transmitter electronics), and cheap and easy to manufacture.

In some scenarios, efficiency may be difficult to balance with cheap and easy manufacture. Some cheap and easy to manufacture options may involve integrating an antenna into a circuit board (e.g., with a "series-fed patch array"), which is used by many off-the-shelf automotive radars. However, such antennas may lose much of their energy into heating up the substrate of the circuit board. Antennas with the lowest loss may include all-metal designs, but typical all-metal antennas, such as slotted waveguide arrays, can be difficult to manufacture with the small geometries compatible with 77 GHz operation.

SUMMARY

In one aspect, the present application describes a radar system. The radar system includes a plurality of radiating elements, where the radiating elements are configured to radiate electromagnetic energy. The radar system also includes a plurality of feed waveguides, where each feed waveguide is configured to guide electromagnetic energy to at least one of the plurality of radiating elements such that each radiating element corresponds to one of the plurality of feed waveguides. Each feed waveguide has a height and width dimension in common with each other feed waveguide, and the plurality of feed waveguides is arranged such that centers of the heights of the feed waveguides are located in a common plane. The radar system also includes a plurality of waveguides arranged as a dividing network. The dividing network is configured to receive electromagnetic energy from a source. The dividing network is also configured to split the electromagnetic energy from the source among the plurality of feed waveguides, such that each feed waveguide receives a respective portion of the electromagnetic energy from the source. Additionally, the dividing network is configured to adjust a phase of the electromagnetic energy received by each waveguide. The splitting and adjusting of the dividing network may be based in part based on differences in width between the waveguides of the dividing network and the feed waveguides and the dividing network of waveguides is located in the common plane of the feed waveguides.

In another aspect, the present application describes a method of radiating a radar signal. The method includes receiving electromagnetic energy from a source. The method also includes splitting the electromagnetic energy from the source as a divided signal among a plurality of feed waveguides by a dividing network, such that each feed waveguide receives a respective portion of the electromagnetic energy from the source. Additionally, the method includes for each of the plurality of feed waveguides, adjusting a phase of the electromagnetic energy received by each feed waveguide by the dividing network. Also, the method includes for each of the plurality of feed waveguides, coupling electromagnetic energy to a plurality of radiating elements coupled to the feed waveguide. Further, the method includes radiating electromagnetic energy by the plurality of radiating elements coupled to the plurality of feed waveguides. The splitting and adjusting of the method are based in part based on differences in width between the waveguides of the dividing network and the feed waveguides, and the dividing network is located in a common plane of the feed waveguides.

In yet another aspect, the present application describes a radar unit. The radar unit includes a plurality of feed waveguides located in a common plane, each feed waveguide configured to guide electromagnetic energy from an end of the feed waveguide to at least one radiating element coupled to the feed waveguide. The radar unit also includes a waveguide source. Further, the radar unit also includes a dividing network comprising a plurality of waveguides, where the dividing network is located in the common plane. The dividing network is configured to receive electromagnetic energy from the source. The dividing network is also configured to split the electromagnetic energy from the source among the plurality of feed waveguides, such that each feed waveguide receives a respective portion of the electromagnetic energy from the source. The dividing network is further configured to adjust a phase of the electromagnetic energy received by each feed waveguide. The splitting and adjusting of the dividing network are based in part based on differences in width between the waveguides of the dividing network and the feed waveguides, and the dividing network comprises reactive elements and no absorption load elements.

In still another aspect, a system is provided that includes a means for radiating electromagnetic energy. The system includes means for receiving electromagnetic energy from a source means. The system also includes means for splitting the electromagnetic energy from the source means as a divided signal among the plurality of feed guide means by a dividing means, such that each feed guide means receives a respective portion of the electromagnetic energy from the source means. Additionally, the system includes for each of the plurality of feed waveguides, means for adjusting a phase of the electromagnetic energy received by each feed guide means by the dividing means. Also, the system includes for each of the plurality of feed waveguides, means for coupling electromagnetic energy to a plurality of radiating means coupled to the feed guide means. Further, the system includes means for radiating electromagnetic energy by the plurality of radiating means coupled to the plurality of feed guide means. The means for splitting and means for adjusting of the system are based in part based on differences in width between the guide means of the dividing mean and the feed guides means, and the dividing mans is located in the common plane of the feed guide means.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 4C illustrates an example three-dimensional beam-forming network, in accordance with an example embodiment feeding a 5×10 array of OEWG arrays.

FIG. 4D illustrates an example three-dimensional beam-forming network with short wall coupling, in accordance with an example embodiment.

FIG. 4E illustrates an example three-dimensional beam-forming network with short wall coupling, in accordance with an example embodiment.

DETAILED DESCRIPTION

Figure 1:
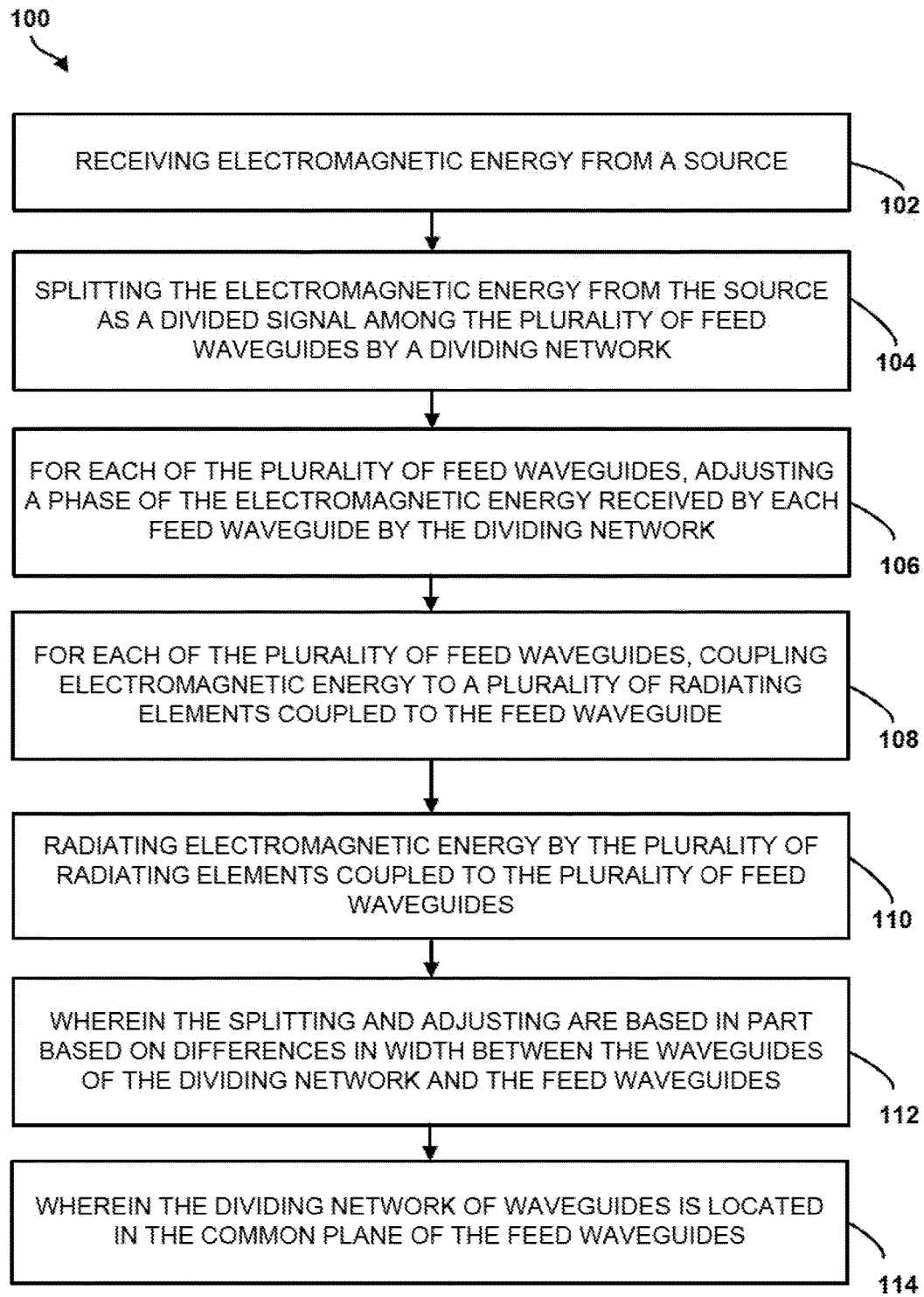
FIG. 1 is a flowchart of an example method to radiate electromagnetic energy.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The following detailed description discloses an apparatus for a "dual open-ended waveguide" (DOEWG) antenna for a radar system for an autonomous vehicle, for instance, and a method for fabricating such an antenna. In some examples, the term "DOEWG" may refer herein to a short section of a horizontal waveguide channel plus a vertical channel that splits into two parts, where each of the two parts of the vertical channel includes an output port configured to radiate at least a portion of electromagnetic waves that enter the antenna.

An example DOEWG antenna may comprise, for example, two metal layers (e.g., aluminum plates) that can be machined with computer numerical control (CNC), aligned properly, and joined together. The first metal layer may include a first half of an input waveguide channel, where the first half of the first waveguide channel includes an input port that may be configured to receive electromagnetic waves (e.g., 77 GHz millimeter waves) into the first waveguide channel. The first metal layer may also include a first half of a plurality of wave-dividing channels. The plurality of wave-dividing channels may comprise a network of channels that branch out from the input waveguide channel and that may be configured to receive the electromagnetic waves from the input waveguide channel, divide the electromagnetic waves into a plurality of portions of electromagnetic waves (i.e., power dividers), and propagate respective portions of electromagnetic waves to respective wave-radiating channels of a plurality of wave-radiating channels. The two metal layers may be called a split block construction.

In various examples, the power dividing elements of the DOEWG antenna may be a three-dimensional dividing network of waveguides. The three-dimensional dividing network of waveguides may use waveguide geometry to divide power. For example, the feed waveguides may have a predetermined height and width. The predetermined height and width may be based on a frequency of operation of the radar unit. The three-dimensional dividing network may include waveguides that differ in height and/or width from the predetermined height and width of the feed waveguides in order to achieve a desired taper profile.

In the present disclosure, feed waveguides that provide a signal to radiating elements may be divided between the top and bottom portions of the split block. Further, the feed waveguides may all be located in a common plane where the midpoint of the height of feed waveguides is common for all of the feed waveguides. The three-dimensional dividing network of waveguides may be located partly in the same plane as the feed waveguides and partly in at least one other plane. For example, the entire height of a portion of the three-dimensional dividing network of waveguides may be machined into either the first or second portion of the split-block. When the two block pieces are brought together, a surface of the other block portion may form an edge of the portion or the three-dimensional dividing network of waveguides that has its height fully in one of the two block sections. In some examples, the vertical portion of these waveguide cavities and cuts are symmetric with respect to the split block seam.

In another example, the power dividing elements may be a two-dimensional dividing network of waveguides. The two-dimensional dividing network of waveguides may use waveguide geometry to divide power. For example, the feed waveguides may have a predetermined height and width. The predetermined height and width may be based on a frequency of operation of radar unit. The two-dimensional dividing network may include waveguides that differ in width from the predetermined width of the feed waveguides in order to achieve the desired taper profile. Thus, the dividing network may have a geometry that is varied compared to the feed waveguide geometry.

In the present disclosure, the feed waveguides may be divided between the top and bottom portions of the split block. Further, the feed waveguides and the two-dimensional dividing network may all be located in a common plane where the midpoint of the height of feed waveguides is common for all of the feed waveguides. When the two block pieces are brought together, the two half-height waveguide portions may couple and form a full-height waveguide.

In yet another example, the power dividing elements may be a three-dimensional dividing network of waveguides. The three-dimensional dividing network of waveguides may form hybrid couplers to divide the electromagnetic energy. In practice, the three-dimensional dividing network may include waveguides that have a portion of the length of a respective waveguide adjacent to the length of a portion of another waveguide. The waveguides may have adjacent short walls. The two waveguides may be separated by a thin metal sheet. A coupling aperture may be formed based on cutouts, holes, or spaces in the thin metal sheet to allow electromagnetic energy to couple from one waveguide to the adjacent waveguide.

Additionally, in a region that forms a short wall hybrid coupler, a full-height waveguide may be formed in a top block portion and a full-height waveguide may be formed in a bottom block portion. A thin metal layer may be located at the seam between the two block portions to form both an edge of the respective waveguide of the dividing network and a coupling aperture. Holes, cuts, perforations, or areas without the thin metal layer may form the aperture by which electromagnetic energy may couple from one waveguide of the dividing network to another waveguide of the dividing network.

Both the three-dimensional dividing network of waveguides and the two-dimensional dividing network of waveguides presented herein allows a power dividing beamforming network to be constructed to be more compact (i.e. fit in a smaller volume) than traditional beamforming networks. Further, the three-dimensional dividing network and the two-dimensional dividing network of waveguides presented herein may be constructed with reactive components. In practice, a reactive beam forming network may avoid use of absorbing load elements. The use of reactive elements without absorbing load elements may enable the radar system to operate more efficiently.

Further, the first metal layer may include a first half of the plurality of wave-radiating channels, where respective wave-radiating channels may be configured to receive the respective portions of electromagnetic waves from the wave-dividing channels, and where first halves of the respective wave-radiating channels include at least one wave-directing member configured to propagate sub-portions of electromagnetic waves to another metal layer.

Moreover, the second metal layer may include second halves of the input waveguide channel, the plurality of wave-dividing channels, and the plurality of wave-radiating channels. The second halves of the respective wave-radiating channels may include at least one pair of output ports partially aligned with the at least one wave-directing member and configured to radiate the sub-portions of electromagnetic waves propagated from the at least one wave-directing member out of the second metal layer. More particularly, a combination of a given wave-directing member with a corresponding pair of output ports may take the form of (and may be referred to herein as) a DOEWG, as described above.

While in this particular example the antenna includes multiple wave-dividing channels and multiple wave-radiating channels, in other examples the antenna may include, at a minimum, only a single channel configured to propagate all the electromagnetic waves received by the input port to one or more wave-radiating channels. For instance, all the electromagnetic waves may be radiated out of the second metal layer by a single DOEWG. Other examples are possible as well.

Furthermore, while in this particular example, as well as in other examples described herein, the antenna apparatus may be comprised of two metal layers, it should be understood that in still other examples, one or more of the channels described above may be formed into a single metal layer, or into more than two metal layers that make up the antenna. Still further, within examples herein, the concept of electromagnetic waves (or portions/sub-portions thereof) propagating from one layer of a DOEWG antenna to another layer is described for the purpose of illustrating functions of certain components of the antenna, such as the wave-directing members. In reality, electromagnetic waves may not be confined to any particular "half" of a channel during certain points of their propagation through the antenna. Rather, at these certain points, the electromagnetic waves may propagate freely through both halves of a given channel when the halves are combined to form the given channel.

In some embodiments discussed herein, the two metal layers may be joined directly, without the use of adhesives, dielectrics, or other materials, and without methods such as soldering, diffusion bonding, etc. that can be used to join two metal layers. For example, the two metal layers may be joined by making the two layers in physical contact without any further means of coupling the layers.

In some examples, the present disclosure provides an integrated power divider and method by which each waveguide that feeds a plurality of radiating doublets of a DOEWG may have its associated amplitude adjusted. The amplitude may be adjusted based on a pre-defined taper profile. Additionally, the present DOEWG may be implemented without complicated manufacturing process. For example, a Computerized Numerical Control (CNC) machining process may be implemented to make the above-described adjustments in parameters such as height, depth, multiplicity of step-up or step-down phase adjustment components, etc. Yet further, the present disclosure may enable a much more accurate method of synthesizing a desired amplitude and phase to cause a realized gain, sidelobe levels, and beam pointing for the antenna apparatus, as compared to other types of designs.

Referring now to the figures, FIG. 1 is a flowchart of an example method 100 to radiate electromagnetic energy. It should be understood that other methods of operation not described herein are possible as well.

It should also be understood that a given application of such an antenna may determine appropriate dimensions and sizes for various machined portions of the two metal layers described above (e.g., channel size, metal layer thickness, etc.) and/or for other machined (or non-machined) portions/components of the antenna described herein. For instance, as discussed above, some example radar systems may be configured to operate at an electromagnetic wave frequency of 77 GHz, which corresponds to millimeter electromagnetic wave length. At this frequency, the channels, ports, etc. of an apparatus fabricated by way of method 100 may be of given dimensions appropriated for the 77 GHz frequency. Other example antennas and antenna applications are possible as well.

Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Referring now to the figures, FIG. 1 is a flowchart of an example method 100 to to radiate electromagnetic energy. It should be understood that other methods of operation not described herein are possible as well.

Moreover, the method 100 of FIG. 1 will be described in conjunction with the other Figures.

At block 102, the method 100 includes receiving electromagnetic energy from a source. The source may be a port (i.e. a through hole) in a bottom metal layer. An electromagnetic signal may be coupled from outside the antenna unit into the waveguide through the source. The electromagnetic signal may come from a component located outside the antenna unit, such as a printed circuit board, another waveguide, or other signal source. In some examples, the source may be coupled to another dividing network of waveguides The electromagnetic energy may be received from a waveguide feed coupled to the waveguide. In one example, receiving electromagnetic energy by a beamforming network input of the waveguide may be performed via a port in a bottom layer and coupling the electromagnetic energy from the port into the waveguide.

Additionally, the waveguide may be aligned on a plane defined by a center of a width of the waveguide and a length of the waveguide. For example, and as discussed with respect to the following figures, the waveguide may be constructed in a block. The waveguide and associated beamforming network may be created on a plane of the block defined by a seam of the block.

At block 104, the method 100 includes splitting the electromagnetic energy from the source as a divided signal among the plurality of feed waveguides by a dividing network. The splitting may be performed with a set of dividers, such as a three-dimensional waveguide beam splitter. The beam splitter is configured to divide electromagnetic energy between a plurality of radiating waveguides. The electromagnetic energy may be divided based on a pre-determined taper profile. The taper profile may be determined based on beam specifications for the transmitted beam. For example, a beam width and beam direction may be controlled based on the taper profile. In some examples, the beam splitting may evenly divide the electromagnetic energy between the plurality of feed waveguides. In another example, the beam splitting may output the electromagnetic energy between the plurality of feed waveguides with the respective electromagnetic energy of the plurality of feed waveguides has equal phase.

At block 106, the method 100 includes for each of the plurality of feed waveguides, adjusting a phase of the electromagnetic energy received by each feed waveguide by the dividing network. The phase shifting may be performed with a set of phase shifters, such as a three-dimensional waveguide beam splitter. The phase shifters are configured to adjust a phase of the divided electromagnetic energy for each of the plurality of radiating waveguides. The divided electromagnetic energy may be phase adjusted based on a pre-determined taper profile. As previously discussed, the taper profile may be determined based on beam specifications for the transmitted beam. For example, a beam width and beam direction may be controlled based on the taper profile.

At block 108, the method 100 includes for each of the plurality of feed waveguides, coupling electromagnetic energy to a plurality of radiating elements coupled to the feed waveguide. In some examples, block 108 includes coupling at least a portion of the electromagnetic energy from the waveguide to each one of a plurality of doublets. In some examples, the radiating elements may be singlets or other type of radiating elements as well.

At block 110, the method 100 includes radiating electromagnetic energy by the plurality of radiating elements coupled to the plurality of feed waveguides. The waveguide may have one or more radiating components. The radiating components may take the form of antennas, slots, or other radiating structures. During the transmission of signals, the radiating components are configured to convert guided electromagnetic energy from inside the waveguide to unguided electromagnetic energy radiated into free space, such that the electromagnetic energy is transmitted by the radiating components. Notably, a radiating component may not transmit all the electromagnetic energy that is exposed to the respective radiating component. Based on both an impedance and polarization match, the radiating component may only transmit a portion of the electromagnetic energy to which it is exposed. A portion of the electromagnetic energy that is not radiated is reflected back into the waveguide as reflected electromagnetic energy.

At block 112, the method 100 includes the splitting and adjusting being based in part on differences in the width between the waveguides of the dividing network and the feed waveguides. The two-dimensional waveguide may be configured with reactive elements. The reactive elements may be formed by adjusting a width of at least one section of the waveguides of the dividing network. Reactive components may enable the dividing network without using load elements to absorb some of the divided energy from the dividing network. By adjusting the width of various waveguide sections coupled to each of the feed waveguides, the desired amplitude and phase of the taper profile for the feed waveguides may be achieved. Further, the two-dimensional waveguide may have a length in the x-dimension that is the same for each of the waveguide sections.

At block 114, the method 100 includes the dividing network being located in a common plane defined by the feed waveguides. In examples presented herein, each of the feed waveguides may lie in a single plane. The plane may be defined by the seam of the split block construction waveguide. The two-dimensional dividing network may lie within the same plane. By having some waveguide portions located within the top or bottom block of the split block, the dividing network may be made more compact than traditional waveguide dividing networks.

Figure 2A:
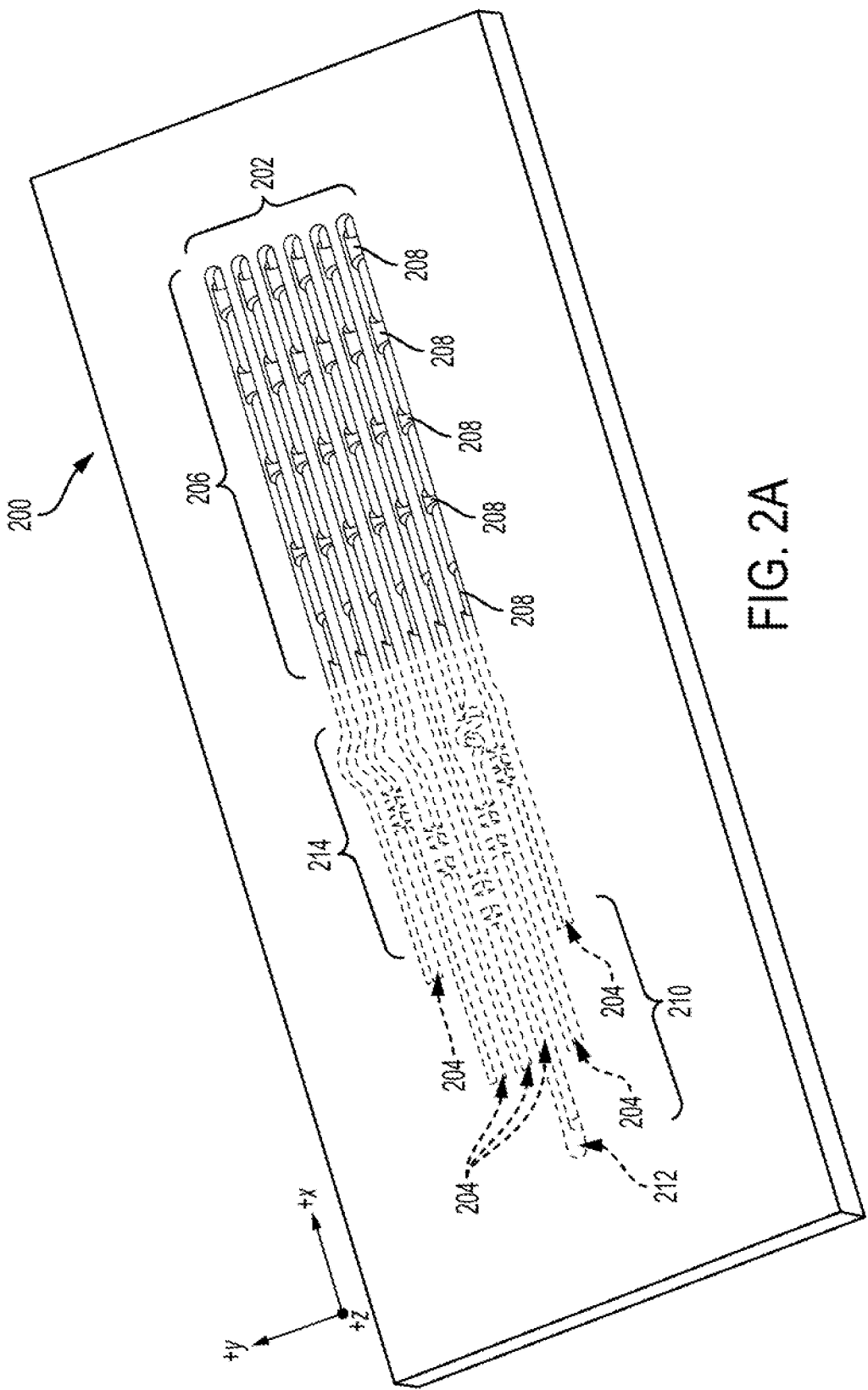
FIG. 2A illustrates a first layer of an example antenna, in accordance with an example embodiment.
Figure 2B:
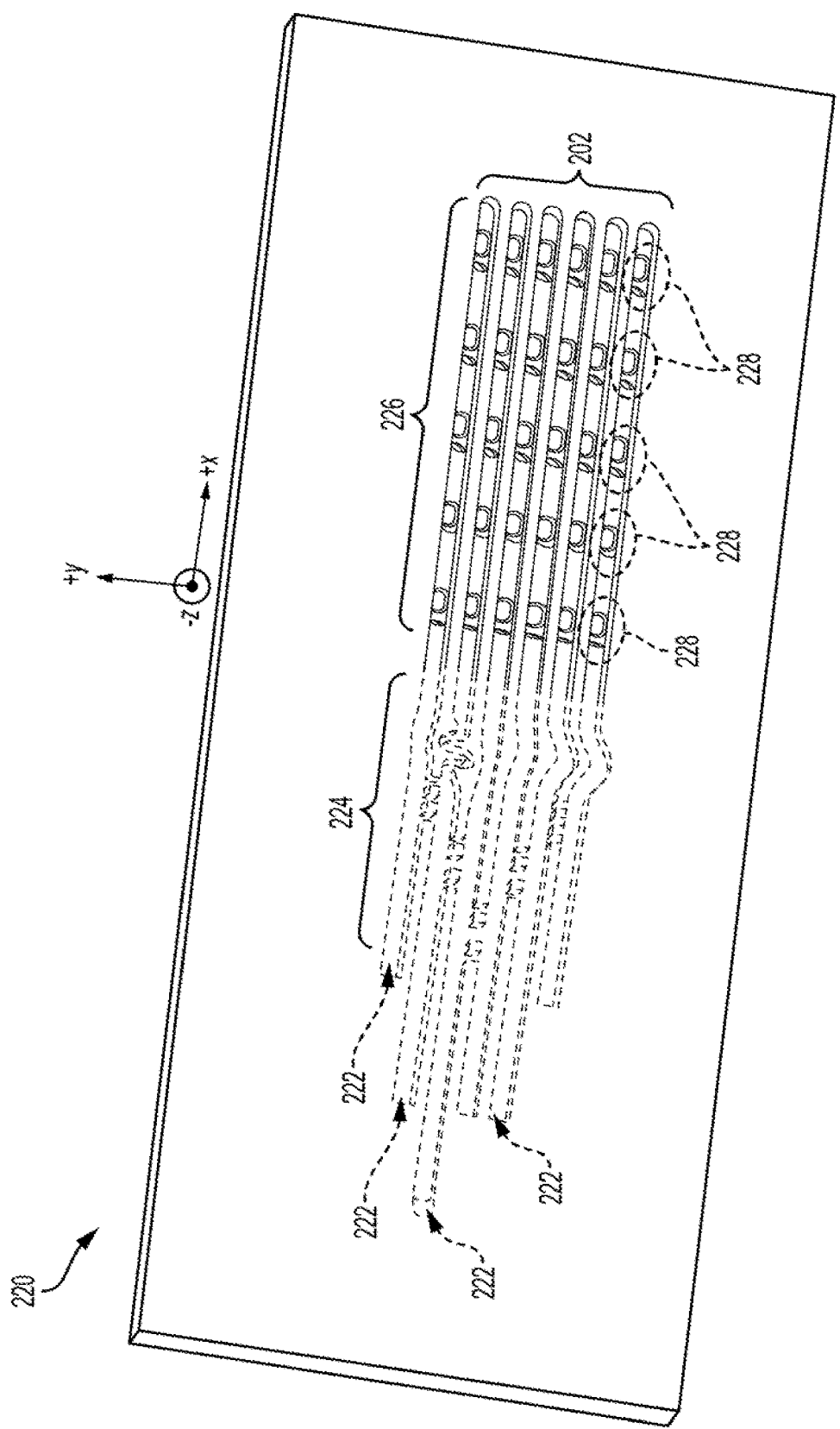
FIG. 2B illustrates a second layer of an example antenna, in accordance with an example embodiment.
Figure 2C:
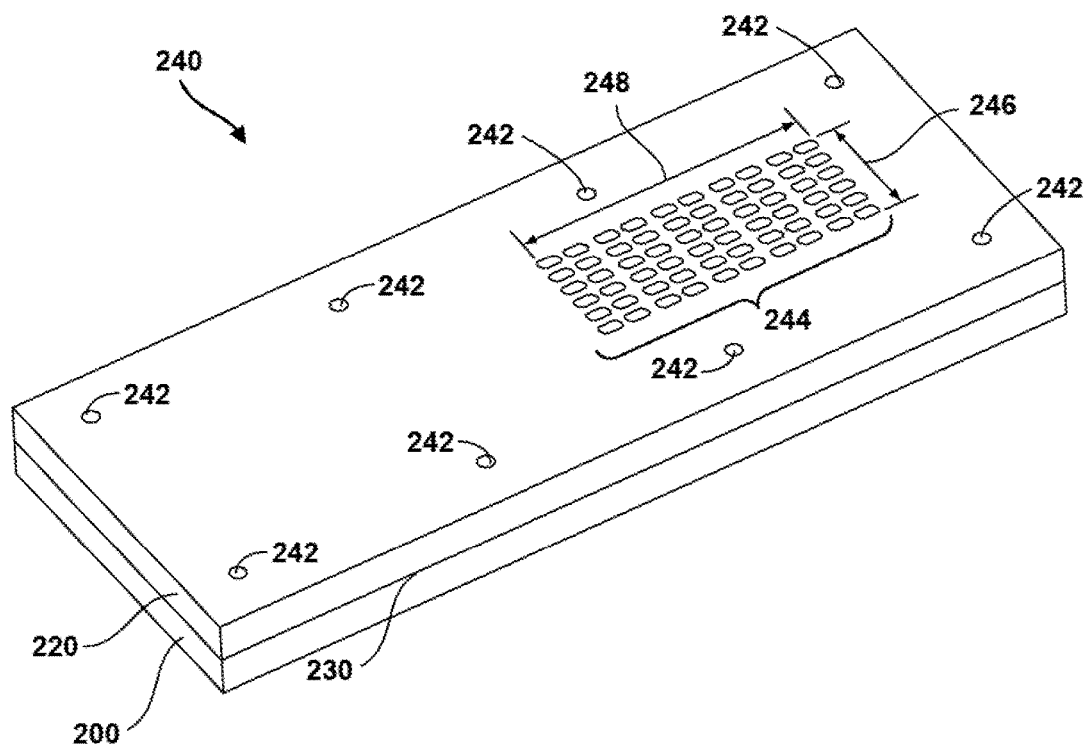
FIG. 2C illustrates an assembled views of an example antenna, in accordance with an example embodiment
Figure 2D:
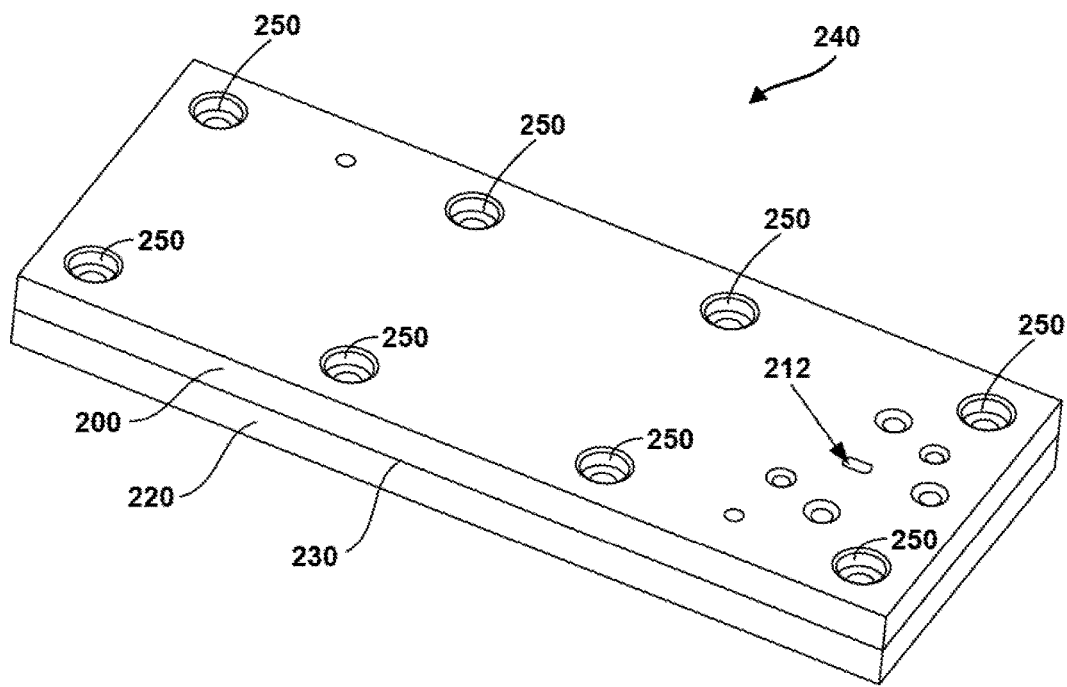
FIG. 2D illustrates an assembled views of an example antenna, in accordance with an example embodiment.
Figure 2E:
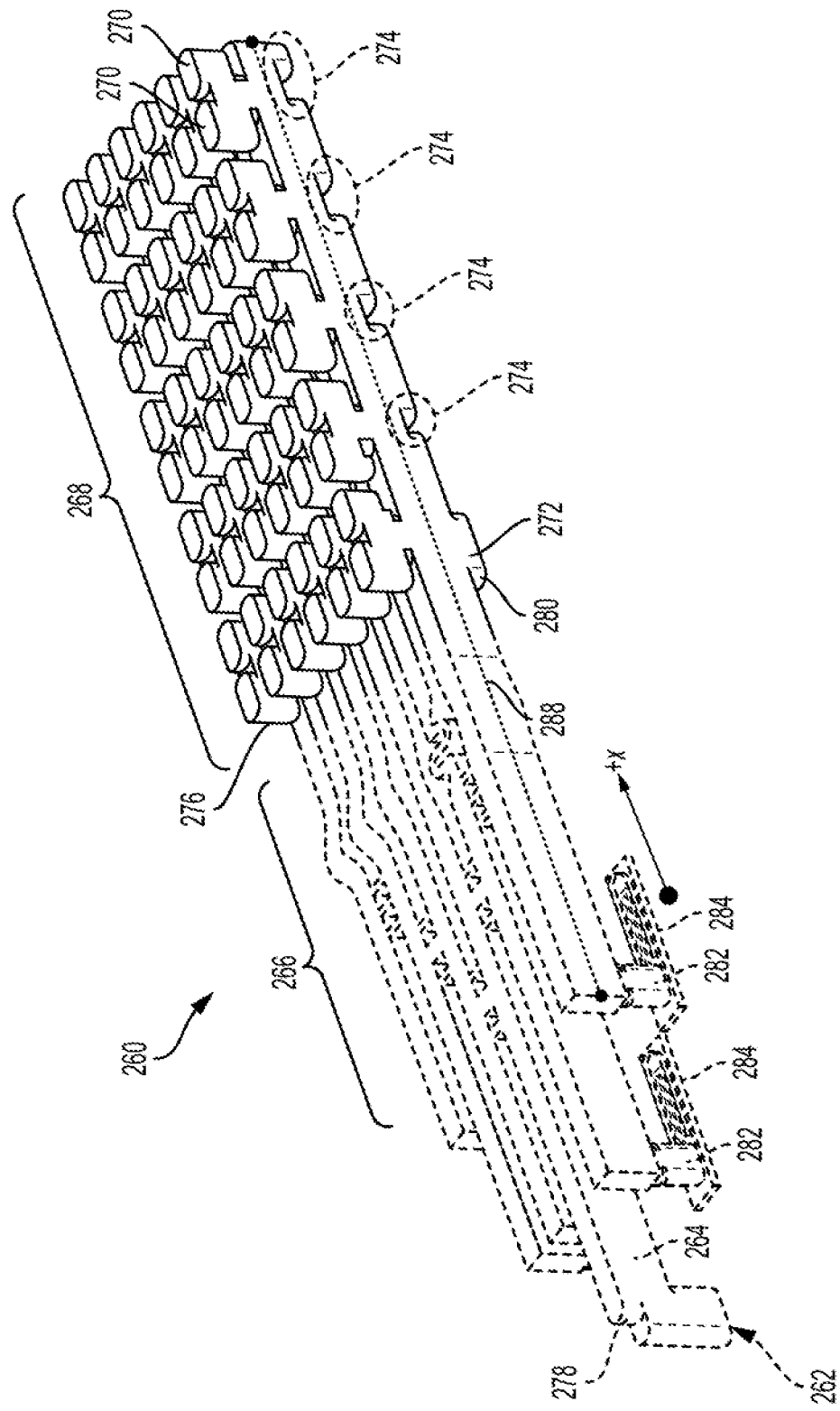
FIG. 2E illustrates conceptual waveguide channels formed inside an assembled example antenna, in accordance with an example embodiment.

Some components illustrated in of FIGS. 2A, 2B, and 2E are shown using broken lines, including elongated segments 204, second end 210, and power dividers 214. The components shown in broken lines are described herein with respect to the alignments shown in the respective figures. However, these components may have altered geometries and/or locations within the context of the disclosure. For example, the presently discussed waveguide dividing networks as disclosed herein may replace a portion of the broken line components of FIGS. 2A, 2B, and 2E.

FIG. 2A illustrates an example first metal layer 200 including a first half of a plurality of waveguide channels 202. These waveguide channels 202 may comprise multiple elongated segments 204. At a first end 206 of each elongated segment 204 may be a plurality of collinear wave-directing members 208, each with sizes similar or different from other wave-directing members. In line with the description above, the first ends 206 of the elongated segments 204 may be referred to herein as a first half of wave-radiating channels.

At a second end 210 of the channels 202 opposite the first end 206, one of the elongated segments 204 may include a through-hole 212 (i.e., input port). A given amount of power may be used to feed a corresponding amount of electromagnetic waves (i.e., energy) into the apparatus, and the through-hole 212 may be the location where these waves are fed into the apparatus. In line with the description above, the single channel/segment of the waveguide channels 202 that includes the input port may be referred to herein as an input waveguide channel.

Upon entering the apparatus, the electromagnetic waves may generally travel in the +x direction, as shown, towards an array of power dividers 214 (i.e., a "beam-forming network"). The array 214 may function to divide up the electromagnetic waves and propagate respective portions of the waves to respective first ends 206 of each elongated segment 204. More specifically, the waves may continue to propagate in the +x direction after leaving the array 214 toward the wave-directing members 208. In line with the description above, the array 214 section of the waveguide channels may be referred to herein as wave-dividing channels.

As the portions of the electromagnetic waves reach the wave-directing members 208 at the first end 206 of each elongated segment 204 of the waveguide channels 202, the wave-directing members 208 may propagate through respective sub-portions of the electromagnetic energy to a second half of the waveguide channels (i.e., in the +z direction, as shown). For instance, the electromagnetic energy may first reach a wave-directing member that is recessed, or machined further into the first metal layer 200 (i.e., a pocket). That recessed member may be configured to propagate a smaller fraction of the electromagnetic energy than each of the subsequent members further down the first end 206, which may be protruding members rather than recessed members. Further, each subsequent member may be configured to propagate a greater fraction of the electromagnetic waves travelling down that particular elongated segment 204 at the first end 206 than the member that came before it. As such, the member at the far end of the first end 206 may be configured to propagate the highest fraction of electromagnetic waves. Each wave-directing member 208 may take various shapes with various dimensions. In other examples, more than one member (or none of the members) may be recessed. Still other examples are possible as well. In addition, varying quantities of elongated segments are possible.

A second metal layer may contain a second half of the one or more waveguide channels, where respective portions of the second half of the one or more waveguide channels include an elongated segment substantially aligned with the elongated segment of the first half of the one or more waveguide channels and, at an end of the elongated segment, at least one pair of through-holes partially aligned with the at least one wave-directing member and configured to radiate electromagnetic waves propagated from the at least one wave-directing member out of the second metal layer.

Within examples, the elongated segment of the second half may be considered to substantially align with the elongated segment of the first half when the two segments are within a threshold distance, or when centers of the segments are within a threshold distance. For instance, if the centers of the two segments are within about ±0.051 mm of each other, the segment may be considered to be substantially aligned.

In another example, when the two halves are combined (i.e., when the two metal layers are joined together), edges of the segments may be considered to be substantially aligned if an edge of the first half of a segment and a corresponding edge of the second half of the segment are within about ±0.051 mm of each other.

In still other examples, when joining the two metal layers, one layer may be angled with respect to the other layer such that their sides are not flush with one another. In such other examples, the two metal layers, and thus the two halves of the segments, may be considered to be substantially aligned when this angle offset is less than about 0.5 degrees.

In some embodiments, the at least one pair of through-holes may be perpendicular to the elongated segments of the second half of the one or more waveguide channels. Further, respective pairs of the at least one pair of through-holes may include a first portion and a second portion. As such, a given pair of through-holes may meet at the first portion to form a single channel. That single channel may be configured to receive at least the portion of electromagnetic waves that was propagated by a corresponding wave-directing member and propagate at least a portion of electromagnetic waves to the second portion. Still further, the second portion may include two output ports configured as a doublet and may be configured to receive at least the portion of electromagnetic waves from the first portion of the pair of through-holes and propagate at least that portion of electromagnetic waves out of the two output ports.

FIG. 2B illustrates the second metal layer 220 described above. The second metal layer 220 may include a second half of the plurality of waveguide channels 202 of the first metal layer 200 shown in FIG. 2A (i.e., a second half of the input waveguide channel, the wave-dividing channels, and the wave-radiating channels). As shown, the second half of the waveguide channels 202 may take on the general form of the first half of the channels, so as to facilitate proper alignment of the two halves of the channels. The elongated segments of the second half 222 may include second halves of the array of power dividers 224. As described above, electromagnetic waves may travel through the array 224, where they are divided into portions, and the portions then travel (i.e., in the +x direction, as shown) to respective ends 226 of the second halves of the elongated segments 222. Further, an end 226 of a given elongated segment may include multiple pairs of through-holes 228, which may be at least partially aligned with the wave-directing members 208 of the first metal layer 200. More specifically, each pair of through-holes may be at least partially aligned with a corresponding wave-directing member, also referred to as a reflecting element, such that when a given sub-portion of electromagnetic waves are propagated from the first metal layer 200 to the second metal layer 220, as described above, those sub-portions are then radiated out of the pair of through-holes (i.e., a pair of output ports) in the −z direction, as shown. Again, the combination of a given wave-directing member and a corresponding pair of output ports may form a DOEWG, as described above.

Moreover, a combination of all the DOEWGs may be referred to herein as a DOEWG array. In antenna theory, when an antenna has a larger radiating aperture (i.e., how much surface area of the antenna radiates, where the surface area includes the DOEWG array) that antenna may have higher gain (dB) and a narrower beam width. As such, in some embodiments, a higher-gain antenna may include more channels (i.e., elongated segments), with more DOEWGs per channel. While the example antenna illustrated in FIGS. 2A and 2B may be suitable for autonomous-vehicle purposes (e.g., six elongated segments, with five DOEWGs per segment), other embodiments may be possible as well, and such other embodiments may be designed/machined for various applications, including, but not limited to, automotive radar.

For instance, in such other embodiments, an antenna may include a minimum of a single DOEWG. With this arrangement, the output ports may radiate energy in all directions (i.e. low gain, wide beamwidth). Generally, an upper limit of segments/DOEWGs may be determined by a type of metal used for the first and second metal layers. For example, metal that has a high resistance may attenuate an electromagnetic wave as that wave travels down a waveguide channel. As such, when a larger, highly-resistive antenna is designed (e.g., more channels, more segments, more DOEWGs, etc.), energy that is injected into the antenna via the input port may be attenuated to an extent where not much energy is radiated out of the antenna. Therefore, in order to design a larger antenna, less resistive (and more conductive) metals may be used for the first and second metal layers. For instance, in embodiments described herein, at least one of the first and second metal layers may be aluminum. Further, in other embodiments, at least one of the first and second metal layers may be copper, silver, or another conductive material. Further, aluminum metal layers may be plated with copper, silver, or other low-resistance/high-conductivity materials to increase antenna performance. Other examples are possible as well.

The antenna may include at least one fastener configured to join the first metal layer to the second metal layer so as to align the first half of the one or more waveguide channels with the second half of the one or more waveguide channels to form the one or more waveguide channels (i.e., align the first half of the plurality of wave-dividing channels with the second half of the plurality of wave-dividing channels, and align the first half of the plurality of wave-radiating channels with the second half of the plurality of wave-radiating channels). To facilitate this in some embodiments, the first metal layer, a first plurality of through-holes (not shown in FIG. 2A) may be configured to house the at least one fastener. Additionally, in the second metal layer, a second plurality of through-holes (not shown in FIG. 2B) may be substantially aligned with the first plurality of through-holes and configured to house the at least one fastener for joining the second metal layer to the first metal layer. In such embodiments, the at least one fastener may be provided into the aligned first and second pluralities of through-holes and secured in a manner such that the two metal layers are joined together.

In some examples, the at least one fastener may be multiple fasteners. Mechanical fasteners (and technology used to facilitate fastening) such as screws and alignment pins may be used to join (e.g., screw) the two metal layers together. Further, in some examples, the two metal layers may be joined directly to each other, with no adhesive layer in between. Still further, the two metal layers may be joined together using methods different than adhesion, such as diffusion bonding, soldering, brazing, and the like. However, it is possible that, in other examples, such methods may be used in addition to or alternative to any methods for joining metal layers that are known or not yet known.

In some embodiments, one or more blind-holes may be formed into the first metal layer and/or into the second metal layer in addition to or alternative to the plurality of through-holes of the first and/or the second metal layer. In such embodiments, the one or more blind-holes may be used for fastening (e.g., housing screws or alignment pins) or may be used for other purposes.

FIG. 2C illustrates an assembled view of an example antenna 240. The example antenna 240 may include the first metal layer 200 and the second metal layer 220. The second metal layer 220 may include a plurality of holes 242 (through-holes and/or blind-holes) configured to house alignment pins, screws, and the like. The first metal layer 200 may include a plurality of holes as well (not shown) that are aligned with the holes 242 of the second metal layer 220. The two metal layers may join at a common plane 230.

Further, FIG. 2C illustrates a DOEWG array 244 of a given width 246 and a given length 248, which may vary based on the number of DOEWGs and channels of the antenna 240. For instance, in an example embodiment, the DOEWG array may have a width of about 11.43 mm and a length of about 28.24 mm. Further, in such an example embodiment, these dimensions, in addition to or alternative to other dimensions of the example antenna 240, may be machined with no less than about a 0.51 mm error, though in other embodiments, more or less of an error may be required. Other dimensions of the DOEWG array are possible as well.

In some embodiments, the first and second metal layers 200, 220 may be machined from aluminum plates (e.g., about 6.35 mm stock). In such embodiments, the first metal layer 200 may be at least 3 mm in thickness (e.g., about 5.84 mm to 6.86 mm). Further, the second metal layer 220 may be machined from a 6.35 mm stock to a thickness of about 3.886 mm. Other thicknesses are possible as well.

In some embodiments, the joining of the two metal layers 200, 220 may result in an air gap or other discontinuity between mating surfaces of the two layers. In such embodiments, this gap or continuity should be proximate to (or perhaps as close as possible to) a center of the length of the antenna apparatus and may have a size of about 0.05 mm or smaller.

FIG. 2D illustrates another assembled view of the example antenna 240. As shown, the first metal layer 200 may include a plurality of holes 250 (through-holes and/or blind-holes) configured to house alignment pins, screws, and the like. One or more of the plurality of holes 250 may be aligned with the holes 242 of the second metal layer 220. Further, FIG. 2D shows the input port 212, where the antenna 240 may receive electromagnetic waves into the one or more waveguide channels 202. The two metal layers may join at a common plane 230.

FIG. 2E illustrates conceptual waveguide channels 260 formed inside an assembled example antenna. More particularly, the waveguide channels 260 take the form of the waveguide channels 202 of FIGS. 2A and 2B. For instance, the channels 260 include an input port 262 to the input waveguide channel 264. The channels 260 also include wave-dividing channels 266 and a plurality of radiating doublets 268 (i.e., a DOEWG array). As described above, when electromagnetic waves enter the channels 260 at the input port 262, they may travel in the +x direction through the input waveguide channel 264 and be divided into portions by the wave-dividing channels 266 (e.g., by the power dividers). Those portions of electromagnetic waves may then travel in the +x direction to respective radiating doublets 268, where sub-portions of those portions are radiated out each DOEWG through pairs of output ports, such as pair 270, for instance.

In a particular wave-radiating channel, a portion of electromagnetic waves may first be propagated through a first DOEWG with a recessed wave-directing member 272 (i.e., an inverse step, or "well"), as discussed above. This recessed wave-directing member 272 may be configured to radiate the smallest fraction of energy of all the members of the DOEWGs of the particular wave-radiating channel. In some examples, subsequent wave-directing members 274 may be formed (e.g., protruded, rather than recessed) such that each subsequent DOEWG can radiate a higher fraction of the remaining energy than the DOEWG that came before it. Phrased another way, each wave-directing member 272, 274 may generally be formed as a "step cut" into a horizontal (+x direction) channel (i.e., a wave-radiating channel, or the "first end" of an "elongated segment" as noted above) and used by the antenna to tune the amount of energy that is radiated vs. the amount of energy that is transmitted further down the antenna.

In some embodiments, a given DOEWG may not be able to radiate more than a threshold level of energy and may not be able to radiate less than a threshold level of energy. These thresholds may vary based on the dimensions of the DOEWG components (e.g., the wave-directing member, a horizontal channel, a vertical channel, a bridge between the two output ports, etc.), or may vary based on other factors associated with the antenna.

In some embodiments, the first and second metal layers may be machined such that various sides of the waveguide channels 260 have rounded edges, such as edge 276, 278, and 280, for example. Further shown in FIG. 2E are both attenuation ports 282 and attenuation components 284. The attenuation components 284 may be coupled to the attenuation ports 282. And the attenuation ports 282 may be coupled to the elongated segments 222 of the wave-dividing channels 266. The design of the attenuation components 284 and attenuation ports 282 are discussed further with respect to FIG. 4B. In examples, where the beamforming (i.e. dividing network) is not completely reactive the attenuation ports 282 may be used to removed electromagnetic energy from the waveguides. The attenuation ports 282 may couple electromagnetic energy to attenuation components 284 in order to absorb the undesired electromagnetic energy. Additionally, the dashed line 288 indicates the common plane of the feed waveguides.

Figure 3A:
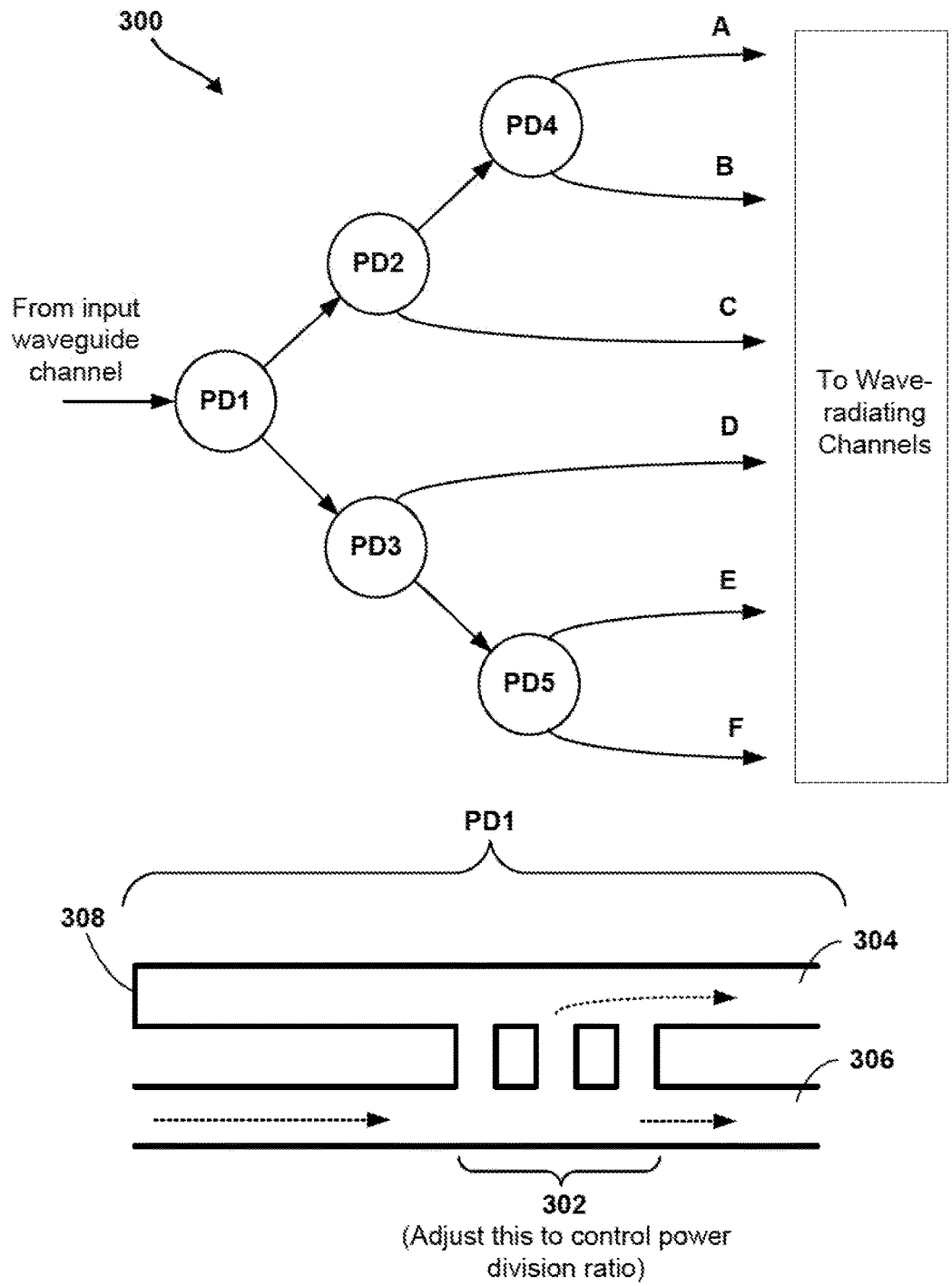
FIG. 3A illustrates a network of wave-dividing channels of an example antenna, in accordance with an example embodiment.
Figure 3B:
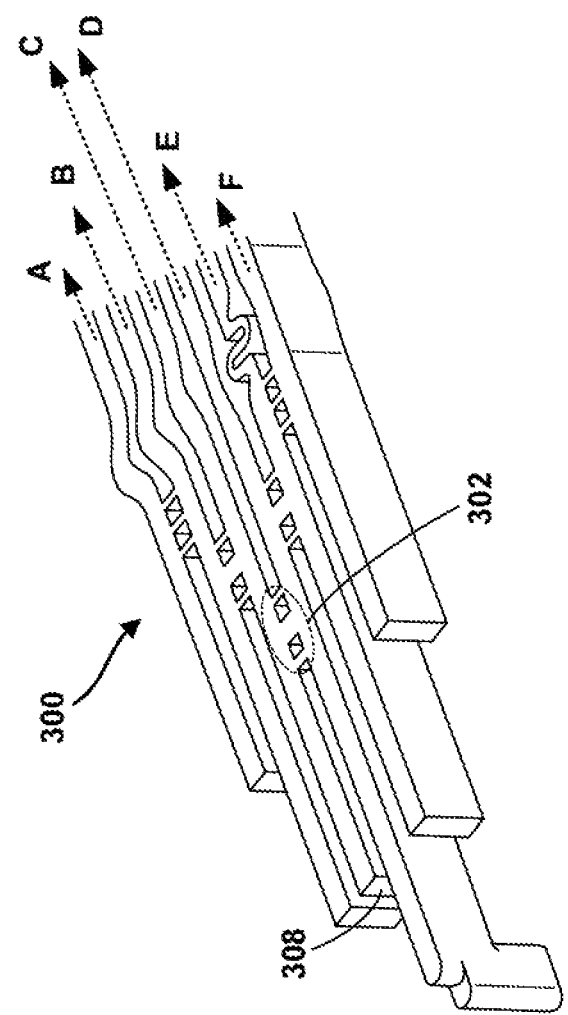
FIG. 3B illustrates an alternate view of the network of wave-dividing channels of FIG. 3A, in accordance with an example embodiment.

FIG. 3A illustrates a network of wave-dividing channels 300 of an example antenna, in accordance with an example embodiment. And FIG. 3B illustrates an alternate view of the network of wave-dividing channels 300, in accordance with an example embodiment.

In some embodiments, the network (e.g., beam-forming network, as noted above) of wave-dividing channels 300 may take the form of a tree of power dividers, as shown in FIG. 3A. Energy may enter the antenna through the input waveguide channel and is divided (i.e., split) into smaller portions of energy at each power divider, such as power divider 302, and may be divided multiple times via subsequent power dividers so that a respective amount of energy is fed into each of the wave-radiating channels (energy A-F, as shown). The amount of energy that is divided at a given power divider may be controlled by a power division ratio (i.e., how much energy goes into one channel 304 versus how much energy goes into another channel 306 after the division). A given power division ratio may be adjusted based on the dimensions of the corresponding power divider. Further, each power divider and associated power division ratio may be designed/calculated in order to achieve a desired "power taper" at the wave-radiating channels. In such a case, the antenna may be designed with a "Taylor window" (e.g., radiation ripples drop off at edges) or other window such that sidelobes of the antenna's far-field radiation pattern may be low. As an example, the power division ratios of the power dividers may be set such that energy portions A, B, C, D, E, and F are approximately 3.2%, 15.1%, 31.7%, 31.7%, 15.1%, 3.2% of the energy, respectively. Other example power divisions are possible as well.

Within examples, a technique for dividing energy between two channels 304, 306 may be to use a structure of channels (e.g., a four-port branchline coupler) such as that shown at the bottom of FIG. 3A. Such a technique and structure design may include a "terminator" 308 at the end of a channel, as shown in FIGS. 3A and 3B, where small wedges of radio frequency-absorbing material may be located to absorb energy that returns backwards through the channel to that terminator 308. The terminator may also be the absorption component of FIG. 2E.

Figure 4A:
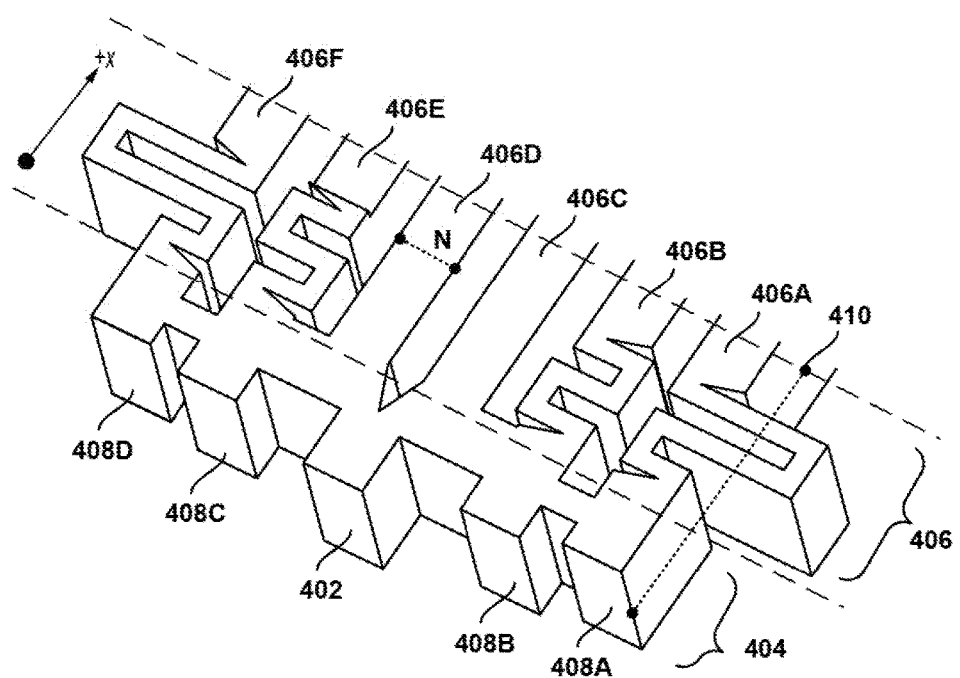
FIG. 4A illustrates an example two-dimensional beam-forming network, in accordance with an example embodiment.

FIG. 4A illustrates an example two-dimensional beamforming network, in accordance with an example embodiment. The two-dimensional beamforming network has two main components. The two-dimensional beamforming network includes a waveguide input 402, a power dividing section 404, and a phase adjusting section 406. The two-dimensional beamforming network may be located in the same plane of the split block construction as the feed waveguides.

The two-dimensional beamforming network of FIG. 4A may include only reactive components. As previously discussed, the use of reactive components may eliminate the need for beamforming network to include absorption components that were previously discussed.

The two-dimensional beamforming network may receive electromagnetic energy at the waveguide input 402, ends 408A-408D may be shorts. The received electromagnetic energy may be divided by the power dividing section 404. The power dividing section 404 may divide the electromagnetic energy as divided electromagnetic energy based on a predetermined taper profile. The divided electromagnetic energy may have its phase adjusted by the phase adjusting section 406. The phase adjustment provided by of each respective phase adjusting trombones sections (406A-406F) in splitting section 406 may also be defined based on the taper profile. As shown in FIG. 4A, a portion of the waveguides of the phase adjusting section 406 may have a width that is different than the widths of the feed waveguides. Further, the waveguides of phase adjusting section 406 may be folded so each respective phase adjusting section 406 occupies the same physical length in the x direction.

The power dividing elements of FIG. 4A are a two-dimensional dividing network of waveguides. The two-dimensional dividing network of waveguides use waveguide geometry to divide power with no changes to the thickness of the waveguide A dimension. As previously discussed, the feed waveguides may have a predetermined height and width. The predetermined height and width may be based on a frequency of operation of radar unit. The two-dimensional dividing network may include waveguides 406A-406F that differ in width from the predetermined width (i.e. the N dimension) of the feed waveguides in order to achieve the desired taper profile. By adjusting the waveguide widths, both the phase and and amplitude of the splitting of the electromagnetic energy may be controlled. Thus, the dividing network may have a geometry that is varied compared to the feed waveguide geometry.

In the present disclosure, the feed waveguides may be divided between the top and bottom portions of the split block. Further, the feed waveguides and the two-dimensional dividing network may all be located in a common plane 410 where the midpoint of the height of feed waveguides is common for all of the feed waveguides. When the two block pieces are brought together, the two half-height waveguide portions may couple and form a full-height waveguide.

Figure 4B:
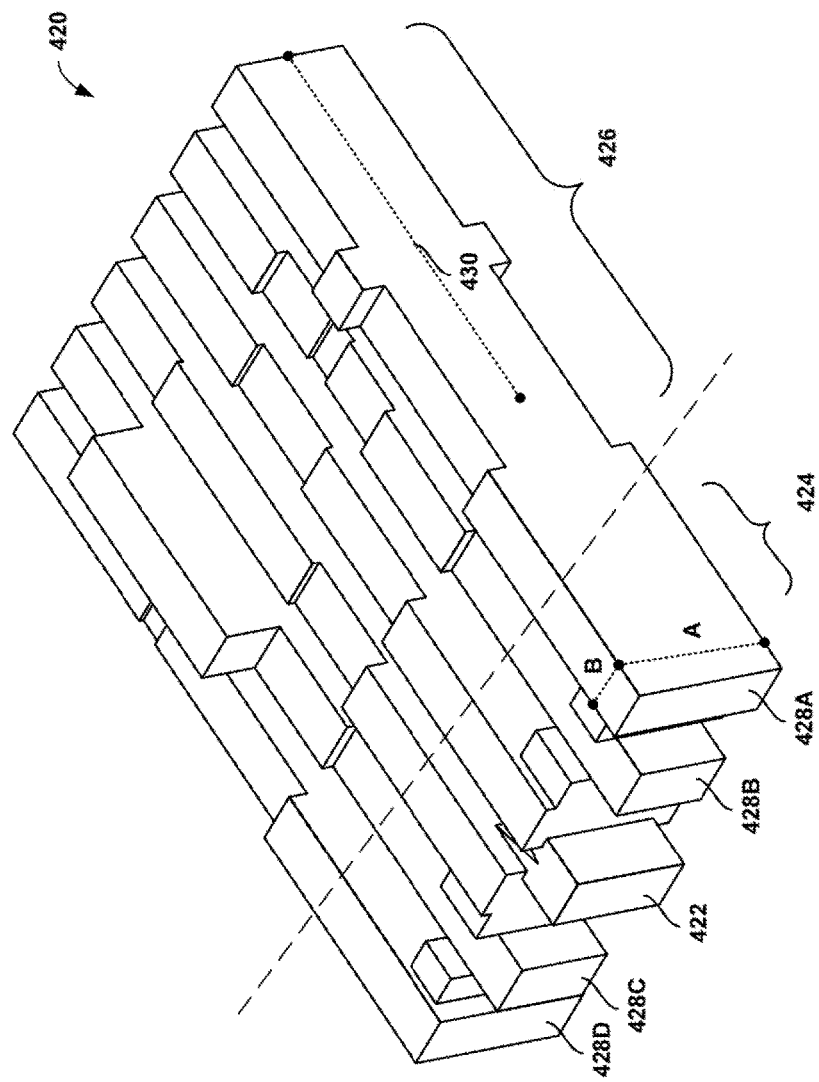
FIG. 4B illustrates an example three-dimensional beam-forming network, in accordance with an example embodiment, showing power dividing section 424 and the phase adjustment lens 426.

FIG. 4B illustrates an example three-dimensional beamforming network, in accordance with an example embodiment. The three-dimensional beamforming network has three main components. The three-dimensional beamforming network includes a waveguide input 422, a power dividing section 424, a phase adjusting section 426 (i.e. a three dimensional phase adjusting lens). The three-dimensional beamforming network may not be completely located in the same plane of the split block construction as the feed waveguides.

The three-dimensional beamforming network of FIG. 4B may include only reactive components. As previously discussed, the use of reactive components may enable the beamforming network to not need the absorption components that were previously discussed.

The three-dimensional beamforming network may receive electromagnetic energy at the waveguide input 422, ends 428A-428D may be shorts. The received electromagnetic energy may be divided by the three dimensional power dividing section 424. The power dividing section 424 may divide the electromagnetic energy as divided electromagnetic energy based on a predetermined taper profile. The divided electromagnetic energy may have its phase adjusted by the phase adjusting (three dimensional phase adjusting lens) section 426. The phase adjustment provided by of each respective phase adjusting section 426 may be achieved by the adjustments of heights (i.e. the A dimension) of the waveguide sections, without any changes to widths (i.e. the B dimension) may also be defined based on the taper profile. The output of the phase adjustment section 426 may be coupled to the feed waveguides as shown in FIG. 4C.

The power dividing elements of FIG. 4B of the DOEWG antenna are a three-dimensional dividing network of waveguides. Similar to the two-dimensional waveguide of FIG. 4A, the three-dimensional dividing network of waveguides may use waveguide geometry to divide power. The predetermined height and width of the feed waveguides may be based on a frequency of operation of the radar unit. The three-dimensional dividing network may include waveguides that differ in height and width from the predetermined height and width of the feed waveguides in order to achieve the desired taper profile. For example, waveguide 428A and 428B are shown having a different height.

As discussed above, the three-dimensional dividing network of waveguides may be located partly in the common plane 430 as the feed waveguides and partly in at least one other plane. For example, the entire height of a portion of the three-dimensional dividing network of waveguides may be machined into either the first or second portion of the split-block. When the two block pieces are brought together, a surface of the other block portion may form an edge of the portion or the three-dimensional dividing network of waveguides that has its height fully in one of the two block sections.

FIG. 4C illustrates an example three-dimensional beamforming network, in accordance with an example embodiment. The three-dimensional beamforming network of FIG. 4C may operate in a similar manner to the previously described beamforming network of FIG. 4B. The three-dimensional beamforming network includes a waveguide input 442, a power dividing section 444, and a phase adjusting section 446. The three-dimensional beamforming network may not be completely located in the common plane 449 of the split block construction as the feed waveguides. Additionally, FIG. 4C shows the radiating section 448 that includes the feed waveguides and the radiating elements. Further, waveguide 448A and 448B are shown having a different height.

FIG. 4D illustrates another example three-dimensional unfolded beamforming network 450 with short wall coupling elements, designated in two examples as 454A and 454B, typically shown as one in the input designated as 452A, in accordance with an example embodiment. Additionally, FIG. 4E illustrates an example three-dimensional folded beamforming network 460 (i.e. a folded version of FIG. 4D) with short wall coupling, designated in two examples as 464A and 464B, in accordance with an example embodiment. This version may be much shorter (in the x-direction) than the unfolded version of FIG. 4D, and may use absorbtion load elements to provide termination on the a PCB. The three-dimensional folded beamforming network with short wall coupling 450 and 460 may not use exclusively reactive elements. Thus, the three-dimensional beamforming network with short wall coupling 450 and 460 may use the previously-discussed absorption components. Additionally, the power division and phase shifting may be based on a predetermined taper profile (as previously discussed). Additionally, the waveguides that form a three-dimensional beamforming network with short wall coupling 450 and 460 may not all be located in the plane defined by the feed waveguides (the plane is defined by 452 and 462 respectively).

The dividing and phase shifting provided by three-dimensional beamforming network with short wall coupling 450 and 460 may be performed based on two stacked waveguide sections having short wall sections that are adjacent to each other. When the short walls are adjacent to each other, they may be separated by a thin metal layer to provide the coupling apertures.

The separation metal layer may be a thin metal layer. The thin metal layer may include a coupling aperture (discussed further with respect to FIG. 4F). The coupling aperture may enable electromagnetic energy to couple from one waveguide section into another waveguide section that is coupled to the short walls. In some examples, one waveguide may be formed in a top block of the split block and the other waveguide may be formed in a bottom block of the split block. The thin metal layer may be located between the two block sections. The three-dimensional beamforming network with short wall coupling 450 and 460 may also have a ramp section. The ramp section may couple a section of waveguide that is not in the common plane of the feed waveguides into the common plane of the feed waveguides. In another example, the ramp section (shown as 482 of FIG. 4F) may couple two adjacent sections of waveguide that are not in the common plane of the feed waveguides into the common plane of the feed waveguides (shown as 480 of FIG. 4F).

The power dividing elements of FIG. 4D of the DOEWG antenna are a three-dimensional dividing network of waveguides. The three-dimensional dividing network of waveguides may form hybrid couplers to divide the electromagnetic energy. As previously discussed, the three-dimensional dividing network may include waveguides that have a portion of the length of a respective waveguide adjacent to the length of a portion of another waveguide. The waveguides may have adjacent short walls. The two waveguides may be separated by a thin metal sheet. The coupling aperture may be formed based on cutouts, holes, or spaces in the thin metal sheet that allows electromagnetic energy to couple from one waveguide to the adjacent waveguide.

Additionally, in a region that forms a short wall hybrid coupler, a full-height waveguide may be formed in a top block portion and a full-height waveguide may be formed in a bottom block portion. A thin metal layer may be located at the seam between the two block portions to form both an edge of the respective waveguide of the dividing network and a coupling aperture. Holes, cuts, perforations, or areas without the thin metal layer may form the aperture by which electromagnetic energy may couple from one waveguide of the dividing network to another waveguide of the dividing network.

Figure 4F:
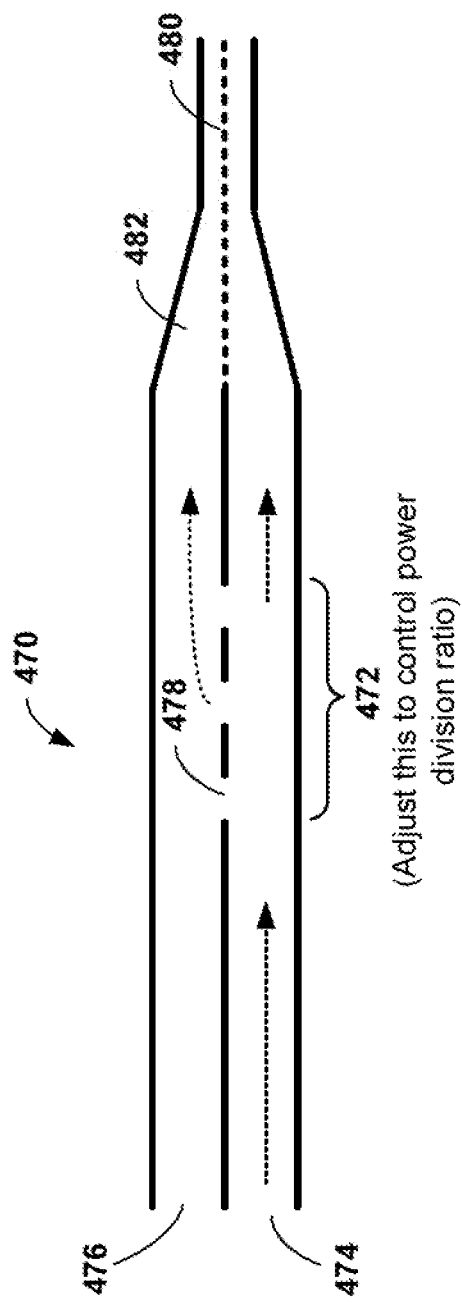
FIG. 4F illustrates an example short wall coupler, in accordance with an example embodiment.

FIG. 4F illustrates an example short wall coupler, in accordance with an example embodiment. The short wall coupler may function in a similar manner to branch line coupler of FIG. 3A. However, the short wall coupler is formed between two sections that are aligned vertically adjacent to each other or can be thought as stacked one on top of another with the shared short wall being a thin metal sheet.

Energy may enter the antenna through an input waveguide channel and is divided (i.e., split) into smaller portions of energy at each power divider, such as power divider 470, and may be divided multiple times via subsequent power dividers so that a respective amount of energy is fed into each of the feed waveguides. The amount of energy that is divided at a given power divider may be controlled by a power division ratio (i.e., how much energy goes into one channel 304 versus how much energy goes into another channel 306 after the division). A given power division ratio may be adjusted based on the dimensions of the corresponding power divider. Further, as previously discussed each power divider and associated power division ratio may be designed/calculated in order to achieve a desired "power taper" at the wave-radiating channels.

Within examples, (such as that shown in FIG. 4F) a technique for dividing energy between two vertically adjacent waveguides 474, 476 may be to use a thin metal layer with a coupling aperture 472 such as that shown in FIG. 4F. Such a technique and structure design may include an absorption component such as the terminator the end of a channel, as shown in FIGS. 3A and 3B, or the absorption component of FIG. 2E. By adjusting the size, shape, and location of the coupling aperture 472, the desired taper profile may be achieved. Further, two adjacent waveguides, each located in a different split block section may couple to ramp section 482 to form a single waveguide. The single waveguide after the ramp section may be located in the common plane of the split block.

It should be understood that other shapes and dimensions of the waveguide channels, portions of the waveguide channels, sides of the waveguide channels, wave-directing members, and the like are possible as well. In some embodiments, a rectangular shape of waveguide channels may be highly convenient to manufacture, though other methods known or not yet known may be implemented to manufacture waveguide channels with equal or even greater convenience.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. A radar system comprising:
a plurality of radiating elements, wherein the radiating elements are configured to radiate electromagnetic energy;
a plurality of feed waveguides, wherein each feed waveguide is configured to guide electromagnetic energy to at least one of the plurality of radiating elements such that each radiating element corresponds to one of the plurality of feed waveguides, wherein each feed waveguide has a height and width dimension in common with each other feed waveguide, and wherein the plurality of feed waveguides is arranged such that centers of the heights of the feed waveguides are located in a common plane; and
a plurality of waveguides arranged as a dividing network having an associated taper profile, wherein the dividing network is configured to:
receive electromagnetic energy from a source,
split the electromagnetic energy from the source among the plurality of feed waveguides, such that each feed waveguide receives a respective portion of the electromagnetic energy from the source,
adjust a phase of the electromagnetic energy received by each waveguide,
wherein the splitting and adjusting are based in part based on differences in width between the waveguides of the dividing network and the feed waveguides, and wherein the taper profile specifies a phase and amplitude for each feed waveguide; and
wherein the dividing network of waveguides is located in the common plane of the feed waveguides.

2. The radar system according to claim 1, wherein the dividing network comprises reactive elements and no absorption load elements.

3. The radar system according to claim 1, wherein the radar system is manufactured using a split-block construction.

4. The radar system according to claim 3, wherein a seam of the split-block is at the center of the height of the feed waveguides.

5. The radar system according to claim 3, wherein a seam of the split-block is at the center of the height of the dividing network of waveguides.

6. The radar system according to claim 1, wherein the dividing network is configured to split the electromagnetic energy based on taper profile.

7. The radar system according to claim 6, wherein the taper profile is selected based on a desired radiation pattern for the radar system.

8. The radar system according to claim 1, wherein a power splitting section of the dividing network is further configured to evenly split the electromagnetic energy from the source among the plurality of feed waveguides.

9. The radar system according to claim 8, wherein the power splitting section is configured to output a plurality of divided signals, each having approximately the same amplitude and phase of each other divided signal.

10. The radar system according to claim 9, wherein a phase adjusting section of the dividing network is further configured to adjust the phase of each respective divided signal based on a predetermined phase shift for each respective divided signal.

11. A method of radiating a radar signal comprising:
receiving electromagnetic energy from a source;
splitting the electromagnetic energy from the source as a divided signal among a plurality of feed waveguides by a dividing network based on a taper profile, such that each feed waveguide receives a respective portion of the electromagnetic energy from the source;
for each of the plurality of feed waveguides, adjusting a phase of the electromagnetic energy received by each feed waveguide by the dividing network;
for each of the plurality of feed waveguides, coupling electromagnetic energy to a plurality of radiating elements coupled to the feed waveguide; and
radiating electromagnetic energy by the plurality of radiating elements coupled to the plurality of feed waveguides;
wherein the splitting and adjusting are based in part based on differences in width between the waveguides of the dividing network and the feed waveguides, and
wherein the dividing network of waveguides is located in a common plane of the feed waveguides.

12. The method according to claim 11, wherein each of the divided signals have approximately the same amplitude as each other divided signal.

13. The method according to claim 12, wherein each of the divided signals have approximately the same phase as each other divided signal.

14. The method according to claim 11, wherein the splitting and dividing are performed by reactive elements and no absorption load elements.

15. The method according to claim 11, wherein each feed waveguide is further configured to conduct electromagnetic energy from the dividing network to the plurality of radiating elements, wherein the conduct electromagnetic energy has approximately zero current at a seam of a split-block.

16. The method according to claim 15, wherein the seam of the split-block is at the center of the height of the feed waveguides.

17. The method according to claim 15, wherein the splitting and dividing are performed based on a predetermined phase shift for each respective divided signal.

18. A waveguide system comprising:
a plurality of feed waveguides located in a common plane having a common height, each feed waveguide configured to guide electromagnetic energy from an end of the feed waveguide to at least one radiating element coupled to the feed waveguide;
a waveguide source;
a dividing network having an associated taper profile comprising a plurality of waveguides, wherein the dividing network is located in the common plane and has the common height, wherein the dividing network is configured to:
receive electromagnetic energy from the source,
split the electromagnetic energy from the source among the plurality of feed waveguides, such that each feed waveguide receives a respective portion of the electromagnetic energy from the source based on the taper profile,
adjust a phase of the electromagnetic energy received by each feed waveguide, and
wherein the splitting and adjusting are based in part based on differences in width between the waveguides of the dividing network and the feed waveguides, and
wherein the dividing network comprises reactive elements and no absorption load elements.

19. The waveguide system of claim 18, wherein the waveguide system is manufactured using a split-block construction, and wherein the seam of the split-block is at a location of the waveguide having approximately zero current.

* * * * *